INVENTOR.
HUGH B. CARR
BY Christy, Parmelee
& Strickland
his ATTORNEYS

United States Patent Office 3,327,861
Patented June 27, 1967

3,327,861
STRAINER
Hugh B. Carr, Carnegie, Pa., assignor to S. P. Kinney Engineers, Inc., Carnegie, Pa., a corporation of Pennsylvania
Filed Aug. 12, 1963, Ser. No. 301,352
3 Claims. (Cl. 210—392)

This invention is for a rotary drum strainer and relates particularly to certain improvements in the construction of the drum and its support on the body in which it revolves.

Rotating drum strainers are extensively used industrially for the removal of solids from liquids. Most generally they are used for the elimination of foreign substances carried in surface water, such as streams or rivers, but may be used for other purposes. As generally constructed, they comprise a cylindrical vertical body closed at the top and bottom with diametrically opposed inlet and outlet pipe connections at the bottom. Incoming water is directed upwardly around the exterior of a drum mounted for rotation on a vertical axis. The drum, which is sometimes cylindrical, but more often in the shape of an inverted truncated cone, has numerous openings in the wall thereof in which are secured individual strainer elements. The top of the drum is closed, but the bottom is open and its lower end has a working fit inside a partition structure that separates the incoming water from the water which flows through the strainer elements to the interior of the drum and out the bottom. This partition structure includes a ring portion into which the lower end of the drum extends, and it is with this ring that the lower end of the drum has a close working fit.

Also, in strainers of this kind, the drum is rotated to progressively move all of the strainer elements in confronting relation to a fixed backwash shoe on the inner wall of the strainer body and bearing against the outer face of the drum so that at this point some of the strainer water inside the drum may flow in the reverse direction through the strainer elements into the shoe and thereby flush away accumulated solids from the outer surface of the strainers. Where the cone is an inverted cone, as it is in most cases, the clearance between the lower end of the drum and the ring in which it rotates is adjusted by vertical adjustment of the drum relative to the ring, and in like manner the working fit of the drum and shoe is effected. This adjustment must be made with micrometer accuracy, notwithstanding that the drum may be several feet high, many feet in circumference, and weigh many hundreds of pounds.

Heretofore the drum shaft has been carried in bearings at the top and bottom of the housing or body, and vertical adjustment was made by the vertical adjustment of a thrust bearing accessible under the bottom of the body, as disclosed for example in Kinney, et al. Patent No. 2,956,683 of Oct. 18, 1960. This requires that the strainer have substantial legs to elevate the strainer sufficiently above the floor level to enable a man to work under it and involves a seal at the bottom which must be given attention from time to time.

According to the present invention there is provided a strainer construction in which all adjustment is made at the top of the strainer body. It in fact enables the shaft bearing at the bottom of the housing to be eliminated entirely together with a substantial length of shaft. This is accomplished through a bearing unit on the cover of the strainer of unique construction. Provision is made for locking the parts in adjusted position so that accidental maladjustment is eliminated. Not only can a reduction be made in the overall height of the strainer through this invention and adjustment be effected more easily and conveniently, but a saving of many hundreds of pounds of metal in the larger strainers can be effected.

An object of the invention is to provide a strainer in which there is a unique adjustable thrust bearing construction for the rotating drum shaft.

A further object is to provide a rotary drum strainer in which the rotary drum is suspended entirely from a drive shaft, and wherein need for a bottom bearing in the strainer body is avoided.

A further object is to provide a novel connection between the drum shaft and the drum.

A further object is to provide a bearing structure in which the vertical adjustment of the drum is effected with micrometer accuracy through collars on the drum shaft, and to provide means for preventing the collars from moving out of adjustment.

A further object is to provide, particularly in large strainers for securing more balanced pressure conditions around the drum to reduce or avoid flexing forces on the short shaft on which the drum is carried.

The invention may be more fully understood by reference to the accompanying drawings, in which.

Figure 1:
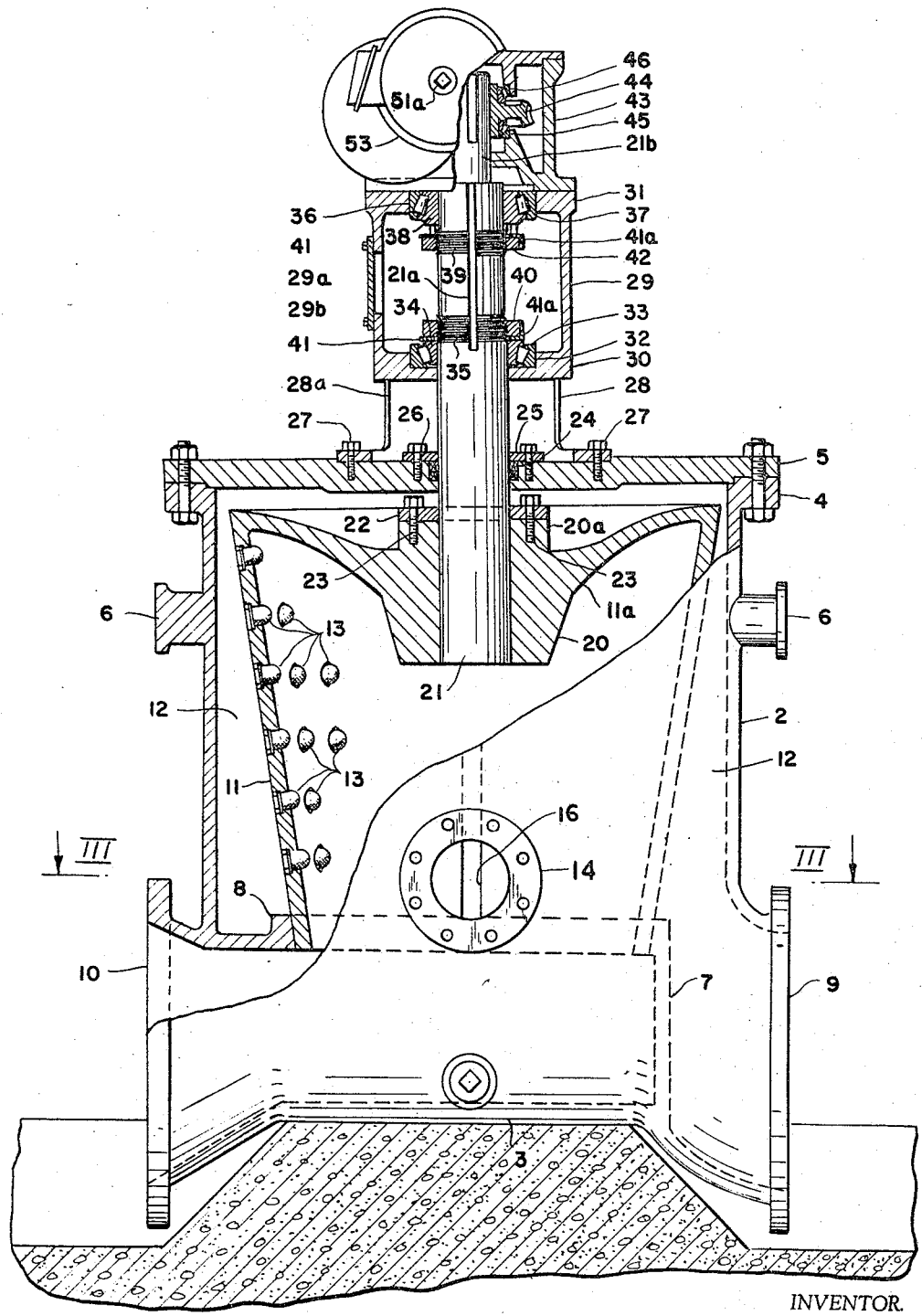
FIG. 1 is a view partly in vertical section and partly in elevation of a strainer constructed in accordance with this invention.

In the drawings, 2 designates the body of the strainer which is of a substantially cylindrical construction. It has a bottom 3. It has an outwardly-turned flange 4 at the top to which is bolted a cover plate 5. Lifting trunnions are indicated at 6. Formed on the interior of the body near the bottom is a partition structure 7 at the top of which is a ring 8. A water inlet for water or other liquid to be strained is indicated at 9. The water outlet is indicated at 10 and is diametrically opposite the inlet 9.

Inside the housing there is a rotary drum 11 which is preferably in the form of an inverted truncated cone. The lower portion of this drum has a close working fit inside the ring 8 and the arrangement is such that water entering the inlet connection 9 enters the space 12 inside the casing 2 around the outside of the drum. Over the surface of the drum there are numerous openings in which are secured strainer elements 13 in the usual way. The water which surrounds the drum passes through these straining elements to the interior of the drum and out the outlet passage 10. The function of the partition 7 with its ring 8 is to separate the incoming water and the outflowing water, and the clearance between the ring 8 and the lower end of the drum must be such as to prevent any substantial flow of water with entrained foreign particles between the exterior of the drum and the ring 8.

Figure 3:
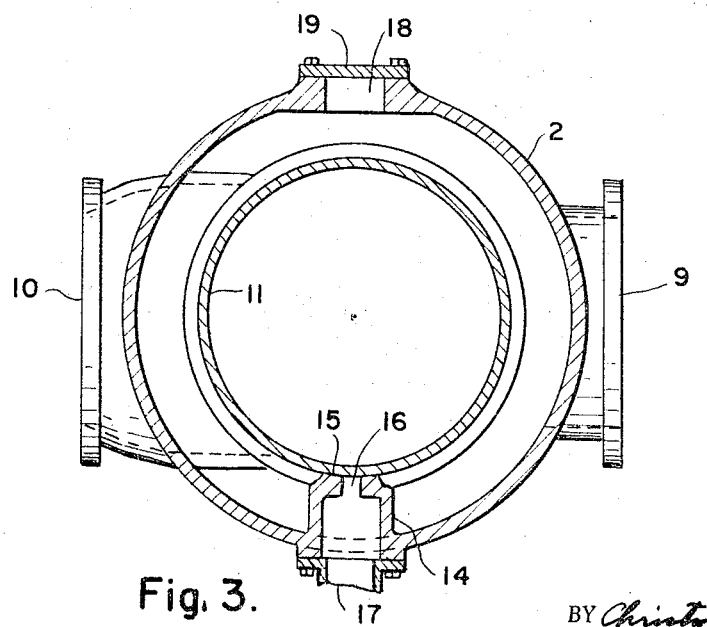
FIG. 3 is a horizontal section in approximately the plane of line III—III of FIG. 1.

Referring to FIG. 3, the body 2 has formed integrally therewith a vertical backwashing shoe 14. The face 15 of this shoe is in confronting relation to the surface of the drum 11 and is at an angle parallel therewith. There is a sliding fit so that the drum can rotate, but no substantial amount of water can flow between the drum and the face of the shoe into the backwash. In the face of the shoe there is a vertical slot 16, and as the drum rotates the restraining elements in the drum are brought opposite this slot so that there may be a reverse flow of water from the interior of the drum outwardly through the filtering elements into the interior of the backwash channel, and in this way matter which is strained from the water and collected in the strainers is dislodged from the strainers and flushed away. This is well known in the art. There is a removable pipe connection constituting a drain carrying away the backwash water and dislodged solids.

In FIG. 3 there is shown a vertical opening 18 in the wall of the body 2 which is substantially coextensive with the height of the drum through which access may be had for repairing or replacing the individual strainer elements 13. Also, access may be had through this opening for the insertion of a feeler gauge between the ring 8 and the lower end of the drum 11 to determine the clearance between these two surfaces. The access opening is normally closed by a cover plate 19 bolted over the opening.

The strainer, as so far described, does not differ substantially from strainers of this type which are known in the art.

According to the present invention the strainer drum has a closed top 11a which slopes downwardly and inwardly toward a central hub 20. The drum 11, its top 11a and hub 20 are preferably cast as a single unit. The hub 20 is vertically elongated so that its lower end projects well down into the interior of the drum, while its upper end portion, designated 20a, is only of slightly less height than the concavity in the top 11a in which it is centered.

A driving shaft 21 is fitted into this hub. The drive shaft has a fixed collar 22 welded thereto. A plurality of bolts 23 pass through the collar into the upper end portion of the hub for detachably securing the drum to the shaft. This arrangement also provides a driving connection through which a rotary motion of the shaft is transmitted to the drum. The height of the upper portion 20a of the hub and the plate 22 is such as to provide only a slight clearance between the tops of the bolts 23 and the under side of the cover 5.

The shaft 21 projects upwardly through the cover and the cover is counterbored at the top around the shaft, providing a recess to receive self-expanding packing rings 24 of a well-known construction. These packing rings are retained in place by an annular plate or collar 25 removably bolted to the cover by bolts 26.

Setting on the cover concentrically about the shaft 21 and bolted to the cover by bolts 27 is a pedestal 28 which has openings 28a therein through which access may be had to the bolts 26 for inspecting and replacing the packing 24. The pedestal is integrally formed with an upper casing or housing 29 having a bottom portion 30 and a top portion 31. The shaft 21 passes upwardly through the casing 29. At the top of this casing it has a reduced extension 21a, there being a shoulder between the larger lower portion of the shaft 21 and its extension 21a. The bottom 30 of the casing supports a race 32 for cone bearings 33. These bearings cooperate with a tapered collar 34 fitted about the shaft 21. A very low pitch thread 35 is formed on the shaft 21 in the area just above this bearing.

The cover portion 31 of the casing 29 supports a similar but reversed race 36 for cone bearings 37 that work against a collar 38. The shaft 21 has other low-pitch threads 39 thereon below this upper bearing assembly.

Figure 5:
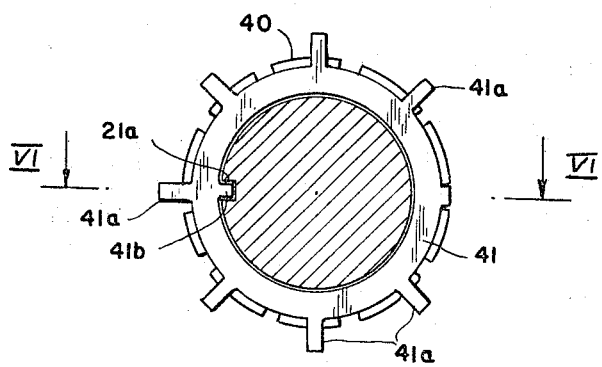
FIG. 5 is a fragmentary section on a larger scale in the plane of line V—V of FIG. 6.
Figure 6:
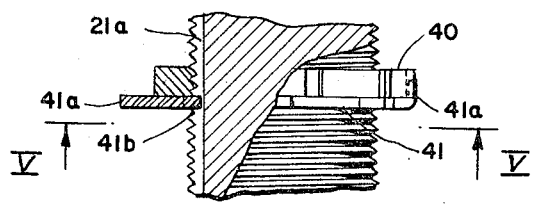
FIG. 6 is a fragmentary view partly in vertical section and partly in elevation of the detail shown in FIG. 5, the section being in the plane of line VI—VI of FIG. 5.

Screwed onto the threaded portion 35 of the shaft 21 above the sleeve 34 is a nut 40 which has a notched or castellated periphery. Between the nut 40 and the sleeve 34 there is a locking ring 41 which, as best seen in FIG. 5, has one or more radial extensions 41a thereon projecting beyond the periphery of the nut 40. The number of notches in the periphery of the nut and the number of tongues 41a on the locking ring 41 are preferably unequal. The shaft 21 is formed with a groove 21a extending downwardly from the top of the main portion of the shaft through the two threaded portions 39 and 35. Also as best seen in FIGS. 5 and 6 the locking ring 41 has an inwardly-projecting tongue 41b which slides in this groove and holds the locking ring 41 against relative rotation on the shaft.

With this arrangement the nut 40 may be screwed down on the shaft portion 35, exerting a thrust on the sleeve 34. This thrust is transmitted through the cone rollers to the race ring 24. When the nut 40 is screwed down in this way, the drum 11 can lifted or moved vertically, since the nut stays at the same level and so exerts a lifting force on the shaft 21. With a tapered strainer drum vertical adjustment of the shaft and drum will establish a proper degree of clearance between the ring 8 and the lower end of the drum 11, and at the same time bring the surfaces of the drum and backwash shoe into the desired relation. When the exact adjustment has been made, one of the tongues 41a of the locking ring is bent upwardly into one of the notches in the periphery of the nut so that the nut 40 is held against relative turning by the locking ring which is held against relative rotation through the engagement of the tongue 41b in the groove 21a. By reason of this interlocking of the nut with the shaft, it rotates with the shaft and drum when the shaft and drum are rotating and the rollers 33 provide a thrust bearing for resisting downward pressure and holding the drum suspended inside the casing. With a low-pitched thread on the shaft and a number of tongues on the locking ring 41, and a different number of notches in the periphery of the nut 40, an extremely close or micrometer adjustment is provided.

There is a similar nut 42 with a castellated periphery screwed on the threaded portion 39 of the shaft 21, and there is a second locking ring, also designated 41, between this nut and the upper bearing sleeve 38. After the drum 11 has been adjusted through the rotation of the nut 40 as above described, the nut 42 is similarly adjusted and then locked by bending down one of the lugs 41a of the upper locking ring 41. The upper bearing thereby resists any upward thrust on the drum 11 or shaft 21, keeping the drum 11 from moving out of adjustment upwardly.

The spaced and reversed cone bearings as described not only comprise thrust bearings to prevent endwise movement of the shaft 21 while permitting its free rotation, but they also constitute the radial bearings for the shaft 21 to keep the shaft 21 absolutely vertical and prevent deflection of the drum by any unequal distribution of pressure about its side walls. This requires of course that the shaft 21 be a relatively heavy shaft, and it requires that the two bearings be spaced such as to resist radial thrust through a favorable leverage.

Figure 2:
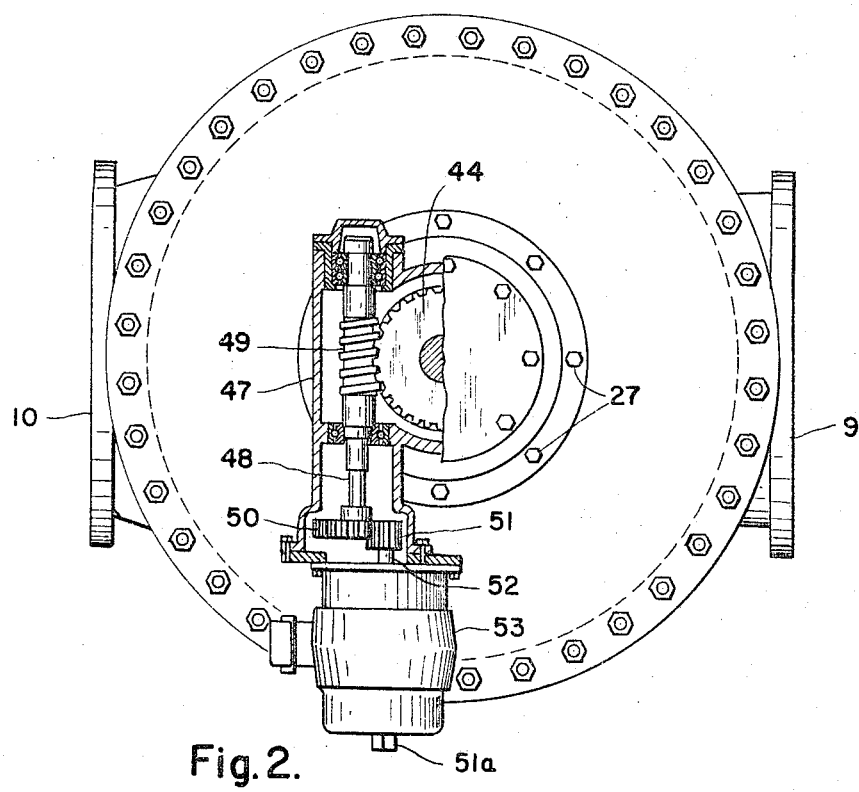
FIG. 2 is a top plan view of the strainer shown in FIG. 1 with part of the drive for rotating the drum shown in section.

Above the upper bearing the shaft 21 has a reduced operating extension 21b to which a driving mechansims may be attached. The mechanism here shown is of the general arrangement shown in my copending application Ser. No. 301,351, filed Aug. 12, 1963, now Patent 3,204,483, granted Sept. 5, 1965. This includes a structure 43 secured to the top of the housing 29. A worm wheel 44 keyed to the extension 21b has the exterior of its hub supported in a lower cone bearing 45 and an upper cone bearing 46. The structure 43 includes a horizontally-extending cylindrical portion 47 best seen in FIG. 2 and a worm shaft 48 having a worm 49 that meshes with the worm gear 44. There is a gear 50 at one end of the worm shaft 48 which engages a smaller pinion 51 on a motor shaft 52 of motor 53 attached to the end of the cylindrical portion 47 of the casting. When the motor is driven the gear 51 meshes with the gear 50 rotating the worm to turn the worm wheel and rotate the drum. The gears 51 and 50 are proportioned to reduce the speed of the shaft 48 below the speed of the motor shaft 52.

As here shown the opposite end of the motor shaft 51 has a square end portion 51a to which a crank or wrench or other suitable handle may be fitted to turn the mechanism manually both when the initial adjustment of the strainer is being made, and for subsequent use should there be a power failure at a critical time.

Access may be had to the nuts 40 and 42 for adjustment as wear occurs through an access opening 29a in the casing 29. This opening is normally closed by a cover plate 29b. The enclosure 29 enables the inside of the casing to be filled with grease.

Figure 4:
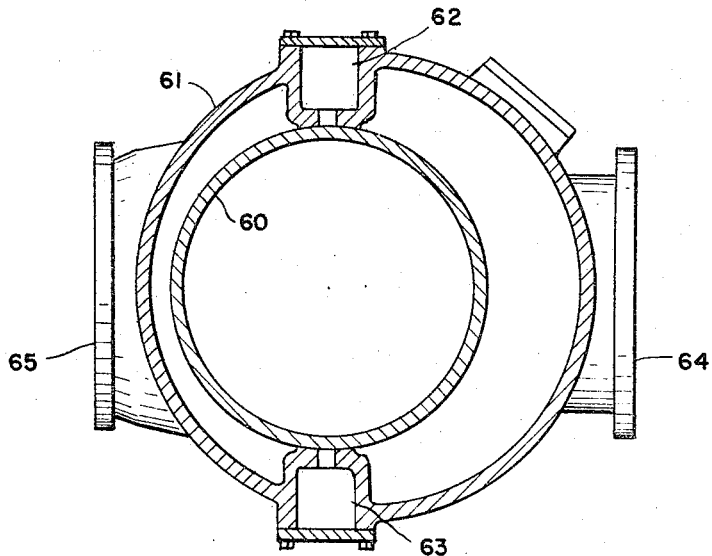
FIG. 4 is a view similar to FIG. 3 but less complete as to detail showing a silghtly modified construction.

Since all of the radial and thrust bearings are at the top of the strainer and the shaft does not extend down through the drum to the bottom of the casing and a lower support, it becomes important particularly in strainers of large sizes and with higher pressures, to avoid any great inequality of pressure around the drum. FIG. 4 more or less schematically illustrates two ways of accomplishing this. According to the first, more than one backwash shoe is employed, these shoes being equidistantly spaced around the drum. In FIG. 4, 60 designates the drum and 61 is the housing. The backwash shoes are designated 62 and 63, and these are equidistantly spaced from each other, being diametrically opposite. Since the backwash of water creates a pressure tending to deflect the drum toward the backwash shoe, the provision of two backwash shoes diametrically opposite each other results in these pressures being equalized, thus relieving the shaft 21 from flexing strains and avoiding excessive radial forces on the bearings at the top from the result of unequal pressure which occurs where only a single backwash shoe is provided. This arrangement of two backwash shoes can of course be used with the structure shown in FIGS. 1 to 3, but in FIG. 4 it will be noted that the axis of the drum is eccentric to the axis of the chamber in which it rotates. In this view the inlet opening is at 64 and the outlet opening is at 65. The nearest approach of the side wall of the drum to the interior of the casing 61 is at the discharge side of the body. The water entering the inlet enters the space where there is maximum clearance between the drum and the interior walls of the shell. The clearance space with this eccentric arrangement decreases around the periphery of the drum just as it does vertically. Since the water is passing through the drum around nearly 360° of its periphery it will be seen that where the drum and casing are eccentric there would be a drop in pressure of the water against the outside of the drum in the area of the drum most remote from the inlet. By reason of this eccentricity of the drum in the casing, the space decreases around the drum as the volume of water becomes less, and hence tends to maintain the pressure on the drum remote from the inlet side equal to the pressure at the inlet side. Biasing forces on the driving shaft 21 may therefore be reduced or eliminated by this second expedient. The eccentricity of the drum in the casing may be employed of course where there is only a single backwash shoe, or where there are two or more backwash shoes.

Where more than a single backwash shoe is employed, one shoe may extend from the bottom partway up the drum, and the other shoe may extend from the top partway down in order to avoid unnecessary restriction of the flow of water around the drum, but even where each backwashing shoe is the full height of the drum there is adequate space for water to flow over the top of the drum from the area nearest the space most remote from the inlet so that the surface of the drum on the outlet side is not starved by reason of the shoes 62 and 63 blocking communication around the periphery of the drum. However, by using shoes which are staggered vertically as above described, there is even less possibility of pressures being inadequate on one side of the drum to balance those on the other.

As shown in the drawings, it is unnecessary to space the bottom of the strainer above the floor level and the strainer bottom may set on the floor while the inlet and outlet pipes may be partially or wholly below floor level. While legs may be provided where desired, the need for having them reduces the overall height of the strainer substantially and eliminates much weight in large strainers. More important, the invention eliminates shaft packing or seals and the thrust bearing in the bottom of the casing or need for men to get under the strainer to adjust the cone. A substantial weight is also eliminated by the use of a short stub shaft 21, while the extended hub at the center of the drum gives full support to the hub on the shaft. The use of the collar 22 and bolts 23 to secure the drum to the shaft facilitates assembly and more importantly, it facilitates separation when, after years of use, the strainer is taken out of service for repair.

While I have shown and described certain specific embodiments of my invention, it will be understood that various changes and modifications may be made therein within the contemplation of my invention and under the scope of the following claims.

I claim:

1. A rotary drum strainer of the type comprising a housing with inlet and outlet connections having a rotary strainer drum of inverted frustro-conical shape therein open at the bottom and closed at the top, the drum being spaced from the walls of the housing, the housing having a bottom and a partition structure on the bottom between the inlet and outlet connections into which the open end of the drum is rotatably received, the housing having backwash shoe means therein bearing against the exterior of the drum, wherein
   (a) the closed top of the drum is formed with a central thickened hub portion,
   (b) the housing having a cover thereon,
   (c) a stub shaft having its lower end terminating in the hub portion and fixed therein and its upper end projecting up through the cover,
   (d) a seal in the cover about the shaft,
   (e) a pedestal fixed on the cover and extending around the shaft, affording access to the seal,
   (f) a bearing casing fixed on the pedestal through which the shaft passes and above which it projects,
   (g) axially spaced adjusting nuts on the shaft located near opposite ends of the bearing casing,
   (h) opposed conical bearing assemblies including a portion fixed on the shaft for movement therewith and a portion fixed to said casing, one said bearing assembly being located adjacent the top of said casing, the other said bearing assembly being spaced therefrom axially along the shaft and adjacent the bottom of the casing, said adjusting nuts engaging against said bearing assemblies confining the shaft against endwise movement relative to the bearing casing whereby the strainer drum is rotatably held in suspension in the housing in proper relation to the backwash shoe and vertically adjustable relative thereto, the axial spacing of said bearing assemblies resisting radial thrust of the shaft,
   (i) and driving means connected with the end of the shaft that projects above the bearing casing.

2. A rotary drum strainer as defined in claim 1 where said backwash shoe means comprises diametrically opposed backwash shoes engaged against the exterior of the inverted frustro-conical drum.

3. A rotary drum strainer as defined in claim 1 wherein the housing is substantially circular in horizontal section, the axis of rotation of the drum being eccentric to the vertical axis of the housing and being closer to the wall of the housing above the outlet opening in the housing than it is to the wall of the housing above the water inlet opening.

References Cited

UNITED STATES PATENTS

| | | | |
|---|---|---|---|
| 1,527,380 | 2/1925 | Roberts | 210—360 X |
| 1,970,276 | 8/1934 | Bullard | 308—207 |
| 1,976,207 | 10/1934 | Zerbe | 308—207 |
| 2,074,866 | 3/1937 | Schmelzer | 210—360 |
| 2,077,589 | 4/1937 | Seaver et al. | 210—402 X |
| 2,253,692 | 8/1941 | De Grave | 210—392 |
| 2,956,683 | 10/1960 | Kinney et al. | 210—393 X |
| 3,026,934 | 3/1962 | Hornbostel | 308—207 X |

SAMIH N. ZAHARNA, *Primary Examiner.*